(12) United States Patent
Su et al.

(10) Patent No.: US 9,579,605 B1
(45) Date of Patent: Feb. 28, 2017

(54) GAS SEPARATION MODULE AND ASSEMBLY

(71) Applicant: Membrane Technology and Research, Inc., Newark, CA (US)

(72) Inventors: Paul Su, Saratoga, CA (US); Moyeen Mohammed, Santa Clara, CA (US); Alicia Breen, Foster City, CA (US); Mamoon Rashid Khan, Newark, CA (US); Nicholas P Wynn, Redwood City, CA (US)

(73) Assignee: Membrane Technology and Research, Inc., Newark, CA (US)

( * ) Notice: Subject to any disclaimer, the term of this patent is extended or adjusted under 35 U.S.C. 154(b) by 0 days.

(21) Appl. No.: 15/087,388

(22) Filed: Mar. 31, 2016

(51) Int. Cl.
*B01D 53/22* (2006.01)
*B01D 63/06* (2006.01)
*B01D 71/02* (2006.01)

(52) U.S. Cl.
CPC .......... *B01D 63/063* (2013.01); *B01D 53/22* (2013.01); *B01D 71/02* (2013.01); *B01D 2053/223* (2013.01); *B01D 2313/04* (2013.01); *B01D 2313/06* (2013.01); *B01D 2313/08* (2013.01); *B01D 2313/10* (2013.01); *B01D 2313/12* (2013.01); *B01D 2319/04* (2013.01)

(58) Field of Classification Search
CPC  B01D 2313/12; B01D 71/02; B01D 2313/08; B01D 2313/06; B01D 2313/10; B01D 2053/223; B01D 2319/04; B01D 63/063; B01D 2313/04; B01D 53/22
See application file for complete search history.

(56) References Cited

U.S. PATENT DOCUMENTS

| | | | |
|---|---|---|---|
| 2,411,238 A | 11/1946 | Zender | |
| 3,610,418 A | 10/1971 | Calderwood | |
| 3,616,929 A * | 11/1971 | Manjikian | B01D 61/08 210/321.9 |
| 3,774,771 A * | 11/1973 | Manjikian | B01D 61/08 210/321.87 |
| 4,080,296 A * | 3/1978 | Clark | B01D 63/024 210/321.87 |
| 4,976,866 A | 12/1990 | Grinstead et al. | |
| 5,013,437 A | 5/1991 | Trimmer et al. | |
| 5,141,640 A | 8/1992 | Sasajima et al. | |
| 5,192,478 A * | 3/1993 | Caskey | B01D 63/022 156/94 |
| 5,202,023 A * | 4/1993 | Trimmer | B01D 53/22 210/321.8 |
| 5,288,308 A | 2/1994 | Puri et al. | |

(Continued)

*Primary Examiner* — Anthony Shumate
(74) *Attorney, Agent, or Firm* — Timothy A. Hott

(57) ABSTRACT

A gas separation module and assembly for housing ceramic tubular membranes. The module includes a plurality of tubes containing the ceramic tubular membranes. The tubes are arranged parallel to one another and are supported by tube sheet plates at each end. Gas-tight seals surround each membrane, preventing a permeate gas within the inner lumen of the membrane from mixing with a feed or residue gas in the tube interior. The module also contains a gas distribution pipe for introducing feed gas into, and withdrawing residue out of, the module. This configuration allows for ceramic tubular membranes to be modularized for use in an assembly that carries out many types of gas separations.

21 Claims, 10 Drawing Sheets

(56) References Cited

U.S. PATENT DOCUMENTS

| | | | | |
|---|---|---|---|---|
| 5,470,469 A * | 11/1995 | Eckman | .................. | B01D 63/02 210/321.78 |
| 5,840,186 A * | 11/1998 | MacAlpine | ............ | B01D 63/06 210/321.78 |
| 6,790,350 B2 | 9/2004 | Pex et al. | | |
| 7,404,843 B2 | 7/2008 | Kaschemekat et al. | | |
| 7,790,030 B2 * | 9/2010 | Schwartz | ............... | B01D 63/00 210/321.8 |
| 9,199,191 B2 * | 12/2015 | Fukuda | .................. | B01D 53/22 |
| 2004/0007527 A1 * | 1/2004 | Pedersen | ............ | B01D 61/142 210/650 |
| 2004/0188339 A1 * | 9/2004 | Murkute | ................ | B01D 61/18 210/321.8 |
| 2006/0144777 A1 * | 7/2006 | Kumano | .............. | B01D 61/022 210/321.79 |
| 2007/0039886 A1 * | 2/2007 | Bruschke | ............. | B01D 61/362 210/640 |
| 2007/0039889 A1 * | 2/2007 | Ashford | ................. | B01D 61/00 210/650 |
| 2009/0301959 A1 * | 12/2009 | Tada | ..................... | B01D 63/021 210/321.87 |
| 2010/0086824 A1 * | 4/2010 | Homel | ....................... | C25B 1/00 429/406 |
| 2013/0098821 A1 * | 4/2013 | Espenan | ................ | B01D 61/18 210/232 |
| 2014/0163664 A1 * | 6/2014 | Goldsmith | ....... | A61B 17/00491 623/1.11 |
| 2015/0217235 A1 * | 8/2015 | Yamaoka | ............... | B01D 53/22 96/8 |

* cited by examiner

Figure 8

GAS SEPARATION MODULE AND ASSEMBLY

FIELD OF THE INVENTION

The invention relates to a gas separation module, and, specifically to modules and assemblies housing ceramic tubular membranes.

BACKGROUND OF THE INVENTION

Industrial gas separations require large, and costly, amounts of membrane in order to carry out the necessary processes. To perform such separations, hundreds to thousands of square meters of membrane are packaged into membrane modules. The development of different technologies for efficiently packing membranes into modules at a low cost has been ongoing since the 1960s.

Current module designs include plate-and-frame and spiral-wound modules for flat-sheet membranes, and potted hollow-fiber designs for polymeric hollow-fiber membranes. Tubular modules are used for tubular membrane configurations, including ceramic tubular membranes as described herein.

U.S. Pat. No. 7,404,843, to Kaschemekat et al. (Membrane Technology and Research, Inc.), discloses one design for housing membranes, including tubular membranes, within an assembly. The assembly contains a plurality of tubes, each housing membrane modules. The tubes are supported by a tube sheet place at one end of the assembly (the feed end) and another tube sheet at the opposite end (the permeate end). A feed gas enters the assembly via a feed port and flows through the feed end tube sheet and into the membrane modules. A permeate gas which has permeated the membrane is collected in a permeate pipe that extends beyond the permeate end tube sheet and allows the permeate gas to exit the assembly via a permeate port. A residue gas flows out of the tubes through openings found on each tube and eventually out of the assembly via a residue port.

Another design for housing tubular membranes within a module is described in U.S. Pat. No. 6,790,350, to Pex et al. (Stichting Energieonderzoek Centnrum Nederland). Here, the tubular membranes are housed within larger diameter tubes and are arranged adjacent and parallel to one another. Individual membranes may be in series or two pairs in parallel with the pairs being arranged in series. While this design provides for an optimized feed flow, it is limited by its serial configuration of tubes.

Despite these designs, there remains a need for an improved gas separation module for housing ceramic tubular membranes that permits parallel flow to all membranes, allows for a sweep gas to be introduced or a second permeate stream to be withdrawn from it, is inexpensive to manufacture, and provides for easy replacement of modules within an overall assembly.

SUMMARY OF THE INVENTION

The present invention relates to a gas separation module and a gas separation assembly that house ceramic tubular membranes. Unlike conventional modules that house tubular membranes, the module of the invention allows all membranes to be fed in parallel. Furthermore, the assembly allows for modules to be connected together within the assembly, significantly decreasing construction costs and footprint. Also, the modules can be easily installed or removed from the assembly, making it easy to replace modules.

In a basic embodiment, the gas separation membrane module, comprises:

(a) a plurality of tubes each having a longitudinal tube wall and a tube interior containing a ceramic tubular membrane that has an outside surface and an inner lumen, each tube wall containing at least one feed gas opening at one end and at least one residue gas opening at the other end;

(b) a first tube sheet plate and a second tube sheet plate each positioned at opposite ends of the module, each tube sheet plate containing a gas distribution pipe opening and at least one of the tube sheet plates having a plurality of permeate gas openings, one permeate gas opening for each tube, the tubes being aligned with the permeate gas openings to provide gas-transferring communication between the permeate gas openings and the inner lumens;

(c) a gas distribution pipe that runs the length of the module through the gas distribution pipe openings, having a pipe interior that is divided into a feed section and a residue section, and having at least one feed aperture in the feed section to provide gas-transferring communication with the feed gas openings, and at least one residue aperture in the residue section to provide gas-transferring communication with the residue gas openings; and (d) a gas-tight seal at each end of each ceramic tubular membrane for holding the membrane in gas-tight relationship against the first and second tube sheet plates.

The module of the invention includes a group of tubes, each containing a ceramic tubular membrane. The tubes are hollow, allowing for a ceramic tubular membrane to be inserted inside. The tubes also have one or more small openings or holes in the tube wall on each end, allowing a feed gas from a gas distribution pipe to enter the tube and make contact with the ceramic tubular membrane. There are also holes at the other end of the tube for a treated residue stream to exit the tube.

The membranes described herein are ceramic, or inorganic, tubular membranes. These membranes have an outside surface and an inner surface defining an inner lumen. For purposes of the present invention, the membrane selective layer is on the outside surface. Accordingly, a permeate component within a feed gas passes through the outer surface and into the inner lumen (known as shell-side feed). In other aspects, the membrane selective layer may be on the inside surface where the feed gas passes from the inner lumen to the outer surface (known as bore-side feed).

The tubes are supported at each end by tube sheet plates. At least one of the tube sheet plates contains corresponding openings for each tube. The openings are large enough for a permeate gas to be withdrawn from the inner lumen of the membrane. In some embodiments, it may be desirable to withdraw the permeate gas from only one end of the module. In other embodiments, both ends of the tube are open, allowing for permeate gases to be withdrawn from both ends of the module. As a further benefit, in some aspects, a sweep-gas may be introduced into the inner lumen through the openings of one of the tube sheet plates.

The tubes containing the ceramic tubular membranes are mounted against or into the tube sheet plates parallel to one another. When the module is in use, the openings or holes at the feed end of each tube enable each tube, and the membrane contained therein, to receive some (a non-zero portion) of the raw feed gas entering the module. This configuration means that the tubular ceramic membranes all operate in parallel to treat the raw gas. To our knowledge, this geometric arrangement is different from all currently known module designs that incorporate more than one tubular ceramic membrane.

In conventional designs, at least some of the tubes are arranged in a series flow configuration, such that gas under treatment can only enter the second or subsequent tubes in the series after it has already passed through the first or previous tubes in the series. In other words, at least some of the tubular ceramic membranes are fed only with residue gas that has already exited another membrane in the module.

The ability to provide entirely parallel flow for all the membranes in the module improves the internal design of the module. This is particularly so when large numbers of tubular ceramic membranes, such as 10, 20 or more, are to be mounted in the module. Furthermore, the "all-parallel" arrangement provides a gas-processing regimen that has not previously been available for users of tubular ceramic membranes. If multiple membranes are connected in series, the inevitable pressure drops that arise along the train of modules from the end that accepts the raw feed to the end that discharges the finished residue may diminish the separation performance of the module, especially if the path from membrane to membrane involves a change in direction of gas flow. Other performance losses arise because the second and subsequent modules receive a partially treated feed gas. This gas has a lower concentration of the component(s) that are faster permeating, and which have, therefore, already passed preferentially into the permeate gas stream. As a result, the driving force for separation in the second and subsequent membranes is reduced compared to the initial driving force.

The tube sheet plates also contain an opening large enough for a gas distribution pipe to fit through it. The gas distribution pipe allows for a raw feed gas to enter the module and a treated residue gas to exit the module. The gas distribution pipe is divided into separate feed and residue sections having no gas communication between them. Dividing the gas distribution may be done by any convenient method, such as by a gas-tight plate or by a partially filled pipe. By dividing the pipe into these sections, the feed gas is prevented from traveling completely down the pipe and mixing with treated residue gas, and thereby not being treated by the membranes. The feed section has at least one aperture, and usually multiple apertures, through which raw feed gas can pass to access the feed ends of the tubes. The residue section also has at least one aperture, and usually multiple apertures, through which the treated residue gas can be collected from the residue ends of the tubes.

When the module is in use, there should be no gas transfer between the outer or shell sides of the tubular ceramic membranes, which are exposed to feed/residue gas, and the bores, which carry the permeate gas, except by permeation through the membranes. The ends of the membranes must, therefore, be held in gas-tight manner against the inner walls of the tubes and/or the tube sheet plates in a manner to prevent such gas transfer. The seal may be created or formed in any manner necessary to prevent leaking of any fluid. Typically, a gas tight seal can be achieved by the use of a U-cup or O-ring. Other components, such as washers and spacers, may be used as frontstops or backstops in combination with the seal in order to make the seal gas-tight.

Owing to manufacturing constraints, ceramic tubular membranes are generally fabricated in short sections, approximately 1 meter long. Thus, in another aspect, the present invention includes a gas-tight connector that connects sections of ceramic tubular membrane within a single tube to form a single longer membrane within that tube. In this manner, a single straight membrane with a length of as much as 2 meters or more can be made.

The gas-tight connector is made up of two pieces. One piece is applied over the end of one membrane section and the other piece is applied over the end of a second membrane section. The connector has interlocking components that, when aligned and rotated, secures the two sections together. A locking pin is placed in one of the interlocking components, which adds to the security of the connection. Within the interior of the connector is a gasket to seal the connector so that no permeate gas leaks from the inner lumen of the membrane. The connector offers essentially no obstruction to gas flow in the feed or permeate channels, enabling the connected sections to function as a single membrane.

In an alternative embodiment, the module does not contain the support tubes, but rather has the ceramic tubular membranes supported between the tube sheet plates and exposed directly to the feed gas coming from the gas distribution pipe. In order to direct the feed gas down the length of the membranes in the module, a series of baffles are placed around the membranes. The baffles are supported by tie rods that are connected to the tube plates and are parallel to the membranes. Despite having to include baffles in this configuration, the lack of tubes helps to reduce the cost and weight of the module.

In another embodiment, the present invention relates to a gas separation assembly housing a single module as described above, the assembly comprising:
  (a) a vessel having a first head comprising a feed nozzle, a second head comprising a residue nozzle, and a shell between the heads, the heads and the shell defining a vessel interior;
  (b) a module as described herein mounted in the vessel interior, and aligned with the feed section of the gas distribution pipe protruding towards or through the feed nozzle and the residue section of the gas distribution pipe protruding towards or through the residue nozzle;
  (c) a gas-tight seal around each of the first and second tube sheet plates for holding the module in a gas-tight relationship against the shell, thereby creating a module interior between the first and second tube sheet plates, and a first permeate chamber between the first head and the first tube sheet plate;
  (d) a dividing plate located within the module interior between the at least one feed aperture and the at least one residue aperture to divide the module interior into a feed chamber and a residue chamber, the dividing plate being in a gas-tight relationship against the shell and having a second gas distribution pipe opening and a plurality of tube openings, one tube opening for each tube; and
  (e) a first permeate nozzle located on the vessel in gas-transferring communication with the first permeate chamber.

The vessel may be of any shape and construction appropriate to its function, which is to contain the modules, and to provide pressure- and gas-tight spaces or environments into which gas can be introduced, and from which it can be withdrawn. Typically, the vessel is a steel pressure vessel with two ends and an elongated central section, adapted to withstand the relatively high differential pressures that are used in gas separations, and pressure code-stamped accordingly.

Most preferably, the vessel is a cylindrical shell with two removable end plates or heads. The heads typically contain a feed or residue nozzle that is connected to, or permits passage of, the gas distribution pipe so that a feed gas or a residue gas can enter or exit the assembly. In certain embodiments, the assembly also contains a feed extension pipe that runs through the feed nozzle of the first head and a residue extension pipe running through the residue nozzle of the second head. Each of these extension pipes may be connected and in gas-transferring communication with the gas distribution pipe.

In some aspects, the assembly further comprises a second permeate (or sweep gas) chamber. The second permeate/sweep gas chamber may be located between the second tube sheet plate the second head.

The vessel is equipped with at least one permeate nozzle that is connected to the first permeate chamber. The first permeate nozzle may be located either on the shell or the first head of the vessel so long as it is in gas-transferring communication with the first permeate chamber. Likewise, a second permeate nozzle may be located either on the shell or the second head of the vessel so long as it is in gas-transferring communication with the second permeate chamber.

The vessel and the tube sheet plates are connected in a gas-tight relationship with each other by expandable seals or the like, so that gas from inside the module cannot leak outside of the module. The seals create a module interior within the shell section of the vessel, which contains feed and residue gas at high pressure when the module is in use. At either end of the vessel adjoining the heads, the seals define permeate chambers, which are at low pressure when the module is in use.

The assembly also contains a dividing plate that is positioned between the tube sheet plates within the module interior. The dividing plate separates the module interior into a feed chamber and a residue chamber, preventing feed gas from mixing with residue gas. Because the dividing plate is located within the module interior, it has openings for the gas distribution tube and each tube housing the ceramic tubular membranes.

The dividing plate is sealed against the shell of the vessel in a gas-tight relationship. During operation, there is usually little pressure drop between the feed and residue gas stream, and hence little pressure difference between the gas in the feed and residue gas chambers. In this case, the dividing plate need not be resistant to high pressure differences, and can be made relatively thin, or of a relatively light, inexpensive material.

The vessel may contain a single module or, more preferably, multiple modules that are connected end-to-end by the gas distribution pipe, so that the residue gas leaving one module can flow into the gas distribution pipe of the other module as a feed gas. Accordingly, in other embodiments, the present invention relates to an assembly for housing more than one gas separation membrane module as described above, the assembly comprising:

(a) a vessel having a first head comprising a feed nozzle, a second head comprising a residue nozzle, and a shell between the heads, the heads and the shell defining a vessel interior;

(b) at least two modules as described herein are mounted in the vessel interior, both modules being aligned with the feed section of the gas distribution pipe protruding towards or through the feed nozzle and the residue section of the gas distribution pipe protruding towards or through the residue nozzle;

(c) a gas-tight seal around each of the first and second tube sheet plates of each module for holding the modules in a gas-tight relationship against the shell, thereby creating a module interior between the first and second tube sheet plates, and a first permeate chamber between the first head and the first tube sheet plate;

(d) a dividing plate located within each module interior between the at least one feed aperture and the at least one residue aperture to divide the module interior into a feed chamber and a residue chamber, the dividing plate being in a gas-tight relationship against the shell and having a second gas distribution pipe opening and a plurality of tube openings, one tube opening for each tube; and (e) a first permeate nozzle located on the vessel in gas-transferring communication with the first permeate chamber.

In some embodiments, the assembly also contains a feed extension pipe that runs through the feed nozzle of the first head and a residue extension pipe running through the residue nozzle of the second head. Each of these extensions pipes may be connected and in gas-transferring communication with the gas distribution pipe.

Typically, the assembly further comprises a second and/or a third permeate chamber. The second permeate chamber may be located between the second tube sheet plate of the first module and the first tube sheet plate of the second module while the third permeate chamber may be located between the second tube sheet of the second module and the second head.

The vessel is equipped with at least one permeate nozzle that is connected to the first permeate chamber. The first permeate nozzle may be located either on the shell or the first head of the vessel so long as it is in gas-transferring communication with the first permeate chamber. Likewise, a second permeate nozzle may be located either on the shell or the second head of the vessel so long as it is in gas-transferring communication with the third permeate chamber. Additional permeate nozzles may be added to the vessel as necessary. Having more than one permeate nozzle on the vessel allows for a sweep gas to be introduced into the assembly to assist in the gas separation process.

While the module and assembly described above relate to gas separation, it is not intended to be limited to that just that application. In some embodiments, the present invention can be used for other types of fluid separations, such as vapor separation or liquid phase separation, or for pervaporation.

It is to be understood that the above summary and the following detailed description are intended to explain and illustrate the invention without restricting it in scope.

BRIEF DESCRIPTION OF THE DRAWINGS

FIG. 8 is a schematic drawing showing an embodiment of an assembly adapted to house the module of FIG. 1.

DETAILED DESCRIPTION OF THE INVENTION

Figure 1:
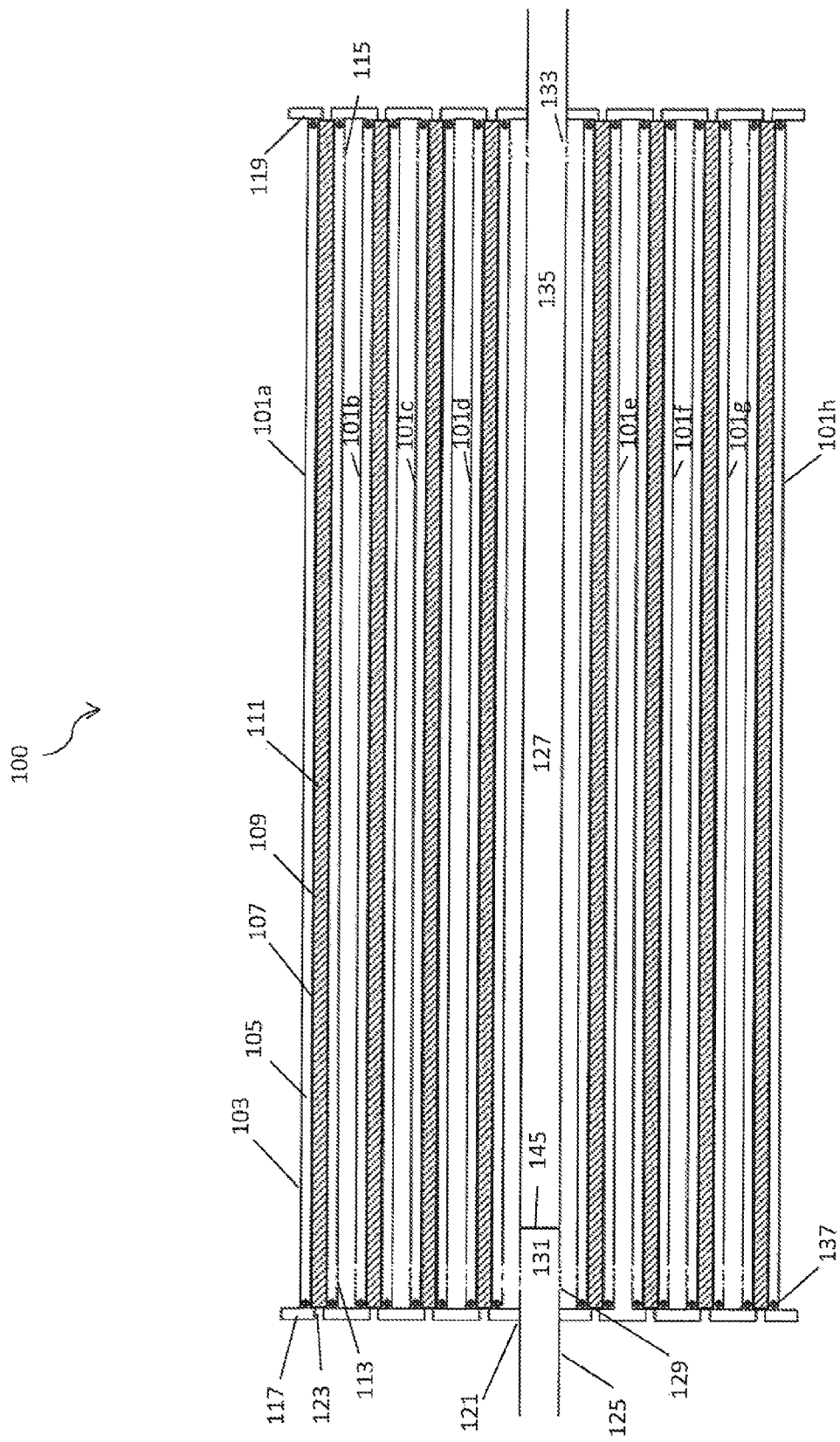
FIG. 1 is a schematic drawing showing a basic embodiment of the gas separation membrane module.

The invention is a gas separation module for tubular ceramic membranes, and an assembly for housing such a module. The module provides for multiple tubular ceramic membranes to be assembled together in a fully parallel arrangement. By this, we mean that a raw feed gas entering the module can be distributed between the membranes such that every membrane in the module is fed in parallel with its own portion of a raw feed gas. The assembly houses one or more of such modules. Within the assembly the individual modules may be arranged in series, such that residue gas from one module becomes feed gas for the next; in parallel, such that raw feed gas entering the assembly is distributed between the modules for treatment; or in an array having a combination of modules in parallel and modules in series.

The ceramic tubular membranes have an outer surface layer and an inner lumen. For simplicity, in the embodiments described herein, the outside surface layer comprises the membrane selective layer, meaning that a permeate component in a feed gas will flow from the outside surface layer to the inner lumen. In other embodiments, as would be familiar to those skilled in the art, the inside surface may comprise the selective layer, allowing for a permeate gas component to flow from the inner lumen to the outside surface layer.

The membranes of the present invention are ceramic tubular membranes made from an artificial or inorganic material. Such materials include, but are not limited to, alumina, titania, zirconia oxides, silicon carbides.

The ceramic tubular membranes are housed within hollow tubes, one membrane per tube. Typically, the module will comprise two or more tubes, arranged generally parallel to one another. There is no upper limit on the number of tubes. Conveniently, the tubes may be arranged symmetrically around the gas distribution pipe (discussed below), but any configuration that allows for raw feed gas distribution to every tube in the module is within the scope of the invention. The tubes comprise a longitudinal tube wall and a tube interior. Each tube has at least one aperture in the longitudinal wall for admitting feed gas, and at least one aperture for discharging residue gas. The apertures should be positioned near the ends of the tubes; their location with respect to other elements of the module and assembly will be explained with respect to the figures.

The membranes are inserted into the tubes through the open ends of the tube. Accordingly, the diameter of the tubes must be large enough for the ceramic tubular membrane to fit within it. When the membrane is placed into the tube, a gap is formed between the outer surface layer of the membrane and the tube wall. This gap forms a feed channel for a feed gas to flow down the tube and be exposed to the membrane during operation.

The tubes are held within the module by means of tube sheet plates, one placed at one end of the tube and the other at the opposite end. The tube sheet plate may directly or indirectly support the tubes in any convenient manner. Thus, the tubes may butt against the tube sheet plates, fit into holes, grooves or lips in the tube sheet plate, be welded to the tube sheet plates, or protrude through holes in the tube sheets, for example.

Likewise, the membranes may be contained entirely within the tube, be flush, or protrude beyond the tube depending on the specific seal.

In order to prevent feed or residue gas from mixing with the permeate gas within each tube, an expandable gas-tight seal, such as an O-ring or the like, is placed around the ends of the membrane. Preferably, gas-tight seals are placed at both ends of the membranes, however, in some embodiments where permeate gas is withdrawn only from one end of the module, only that corresponding end of the membranes may need the seals, as the other ends of the membrane bores are plugged or otherwise closed.

The tube sheet plates comprise a gas distribution pipe opening and a plurality of permeate gas openings, one for each tube. The tubes are aligned over the permeate gas openings to provide gas-transferring communication between the permeate gas openings and the inner lumen of each membrane. The diameter of the permeate gas openings is typically smaller than the diameter of the membrane so that the membranes are secured between the two tube sheet plates. Preferably, the diameter of the permeate gas opening is approximately equal in size to the diameter of the inner lumen. This allows for an unrestricted permeate flow to exit the inner lumen and pass through the permeate gas opening. In certain embodiments in which the permeate gas is to be withdrawn from only one end of the membranes, permeate openings are only required in the tube sheet at that end.

In certain embodiments, multiple tube sheet plates, support plates, or caps may be placed at the ends of the module, adjacent to the original tube sheet plates in order to direct the flow of the feed, permeate, or residue gases into or out of the module or to provide extra support for the tubes, or in some cases, just the membranes. If used, the plates or caps typically have at least a gas distribution pipe opening.

The tube sheet plates can be made of any convenient material that is strong enough to be subjected to whatever pressure difference is maintained between the feed/residue gases and the permeate gas during operation. Typically, the tube sheet plates and tubes will be metal, usually steel, either stainless or carbon, or aluminum, although other metals, or even non-metallic materials, could be used in some circumstances, such as for treating mixtures at relatively low pressures. The tube sheet plates need to be pressure-rated accordingly, and will often have to withstand a pressure difference of several hundred psi or more. The tube sheet plates and tubes may be made of the same material, or of different materials.

A gas distribution pipe runs the length of the module and through the tube sheet plates. Between the tube sheet plates, the gas distribution pipe comprises at least one feed aperture at one end of the pipe and at least one residue aperture at the opposing end. The gas distribution pipe allows for a feed gas to enter the module and flow from the pipe to the tubes through the feed aperture. After treatment, the treated residue gas stream may exit the tubes, flow to the gas distribution pipe through the residue aperture, and out of the module.

In order to prevent the untreated feed gas from mixing with the treated residue gas, the interior of the gas distribution pipe is divided into a feed section and a residue section. The dividing of the pipe interior can be done in any convenient way, such as by a gas-tight plate, which is located between the feed aperture and residue aperture. In some cases, multiple gas-tights plates may be used to divide the pipe interior. This type of configuration is needed in embodiments where the feed gas is introduced via the shell-side of the membrane or in a bore-side feed configuration that uses a sweep-gas.

In another embodiment, there may be two separate short distribution pipes, a feed pipe at one end of the module and a residue pipe at the other.

In alternative embodiments, the tubes containing the ceramic tubular membranes may be dispensed with, leaving the ceramic tubular membranes exposed between the tube sheet plates. The membranes are connected to the tube sheet plates in a gas-tight manner, such as by bonding them directly to the plates or using gas-tight seals of the type described below. In order to direct the feed gas from the gas distribution pipe to the exposed membranes and to improve flow distribution within the module, a series of straight or curved baffles, fins, or ribs extend partially around the module. These baffles, fins, or ribs are supported by tie rods may be placed between the tube sheet plates.

In some embodiments, within each tube, the ceramic tubular membrane is made up of two or more membrane sections, tightly coupled together by a gas-tight connector. In this manner, longer membranes can be formed than would normally be possible.

The assembly incorporates one or multiple gas separation membrane modules contained within a vessel or housing. Typically, during operation, the assembly is positioned on a metal frame or skid. The assembly is usually positioned in a substantially horizontal orientation, but in a less preferred embodiment, may also be substantially vertical.

The vessel or housing has an outer wall or shell, end plates or heads, and an interior space located between two end plates. The outer wall of the vessel is typically of similar material to the tubes and tubes sheet plates, but may vary depending upon the use to which it is to be put and the pressure-rating required. The vessel is pressure rated to provide an internal environment in which membrane gas separation can be carried out safely even at substantially different (higher or lower) pressures than the outside atmospheric pressure.

In some embodiments, the outer wall or shell may further comprise permeate nozzles, one near the first end plate and another near the second end plate. In other embodiments, there may be more than two permeate nozzles located at any convenient location on the shell in order to withdraw a permeate gas out of the vessel or introduce a sweep gas into the vessel.

As is known in the art, a driving force for transmembrane permeation may be supplied by passing a sweep gas across the permeate side of the membrane, thereby lowering the partial pressure of a desired permeant on that side to a level below its partial pressure on the feed side. In this case, the total pressure on the permeate side may be higher than on the feed side, or there may be additional driving force provided by keeping the total feed pressure higher than the total permeate pressure.

At least one of the heads, and preferably both, should be a reversibly removable end plate or cap to provide access to the vessel interior for installation or removal of modules. By this, we mean that the head should preferably not be a unitary part of the vessel, nor attached by welding, but should be bolted, screwed, or the like, to the vessel. The end plates may have any appropriate profile, but usually will be flat or domed. Removable end plates typically include a flange or flanges or a screw thread for attachment to the shell body of the vessel. However, any convenient means of connection of the ends is intended to be within the scope of this embodiment.

The end plates each include a feed/residue nozzle. The ends of the gas distribution pipe, or extensions thereto, will typically pass into or through the feed/residue nozzles, enabling feed gas to enter and residue gas to leave the vessel. Optionally, in certain embodiments, the end plates may further comprise a permeate nozzle for withdrawing a permeate gas out of the vessel or introducing a sweep gas into the vessel.

Between the end plates and within the shell of the vessel is the vessel interior, which contains the module(s). An expandable gas-tight seal, such as an O-ring, U-cup, or the like, is placed around each of the tube sheet plates in order to hold the module in a gas-tight relationship against the shell. By placing the seals around the tube sheet plates, the seals create a module interior between the first and second tube sheet plates. Additionally, the seals also create permeate chambers between the end plates and tube sheet plates on each end of the vessel. The seals prevent any feed or residue gas from leaking out of the module interior and mixing with the permeate gas and vice versa.

The assembly further comprises a dividing plate located within the module interior that divides the module interior into a feed chamber and a residue chamber. The dividing plate may be placed in any location within the module interior between the feed gas and residue gas apertures of the gas distribution pipe. The dividing plate is able to create these discrete chambers because it is in a gas-tight relationship against the shell. Since the dividing plate is within the module interior, it also has a gas distribution pipe opening and a plurality of tube openings for each tube containing a membrane. In some embodiments, more than one dividing plate may be used.

In embodiments where the permeate flow is from inner lumen to the outer surface of the membrane, no such dividing plate is needed since the module interior is filled with permeate gas. However, in embodiments where a sweep gas is used, a dividing plate is used to create a permeate chamber and a sweep gas chamber. The dividing plate helps to prevent the sweep gas from flowing down the module and bypassing the tubes.

The vessel interior is long enough to contain at least one module, and preferably more than one, end to end. In some cases, the vessel interior contains more than four membrane modules, and in other cases, may include more than six membrane modules. There is no upper limit on the number of modules that can be housed in the vessel, subject only to maintaining adequate performance when in use.

In embodiments where the vessel contains more than one module, the residue section of the gas distribution pipe of a first module is connected by a gas-tight connector or coupling to the feed section of the gas distribution pipe of a second module. In this arrangement, the feed, residue, and permeate gases are able to flow from module-to-module, as will be explained in more detail below.

When loaded with membrane modules, the assembly may be used to treat or separate any gas mixture, but is expected to be especially useful in applications where large numbers of membrane modules are needed. Such applications include, but are not limited to, treatment of natural gas streams, treatment of process gas or off-gas streams in refineries, and treatment of gases in petrochemical plants.

Specific representative embodiments of the invention are now illustrated with reference to FIGS. 1-10.

A view of a basic embodiment of the gas separation membrane module is shown in FIG. 1. In this embodiment, and for the embodiments depicted in FIGS. 2-9, the module is adapted to have a permeate flow from the outside surface to the inner lumen.

Referring to this FIG. 1, a module, 100, contains a plurality of tubes, 101*a-h*. For purposes of simplicity and clarity, only one tube, 101*a*, and the membrane contained therein are referred to here. It is to be understood that each tube and membrane in the module are identical to tube 101*a*.

Each of the tubes comprise a longitudinal tube wall, 103, and a tube interior, 105, which is enclosed by the tube wall. The tube wall comprises at least one feed gas opening, 113, at one end and a residue gas opening. 115, at the other end.

A ceramic tubular membrane, 107, is housed within tube 101*a*. Ceramic tubular membrane 107 comprises an outside surface, 109, and an inner lumen, 111. The outside surface, 109, of the membranes comprises the membrane selective layer.

The tubes, 101*a-h*, are held within the module, 100, by means of a first tube sheet plate, 117, and a second tube sheet plate, 119. Tube sheet plates, 117 and 119, comprise a gas distribution pipe opening, 121 (only one shown), and a plurality of permeate gas openings, 123, for each tube, 101*a-h*. The tubes are aligned over the permeate gas openings, 123 (only one opening is labeled for simplicity), to provide gas-transferring communication between the permeate gas openings, 123, and the inner lumen, 111, of membrane, 107.

Gas-tight seals, 137 (only one labeled for simplicity), are placed at the end of each ceramic tubular membrane, 107, for holding the membrane in gas-tight relationship against the tube sheet plates, 117 and 119.

Figure 2:
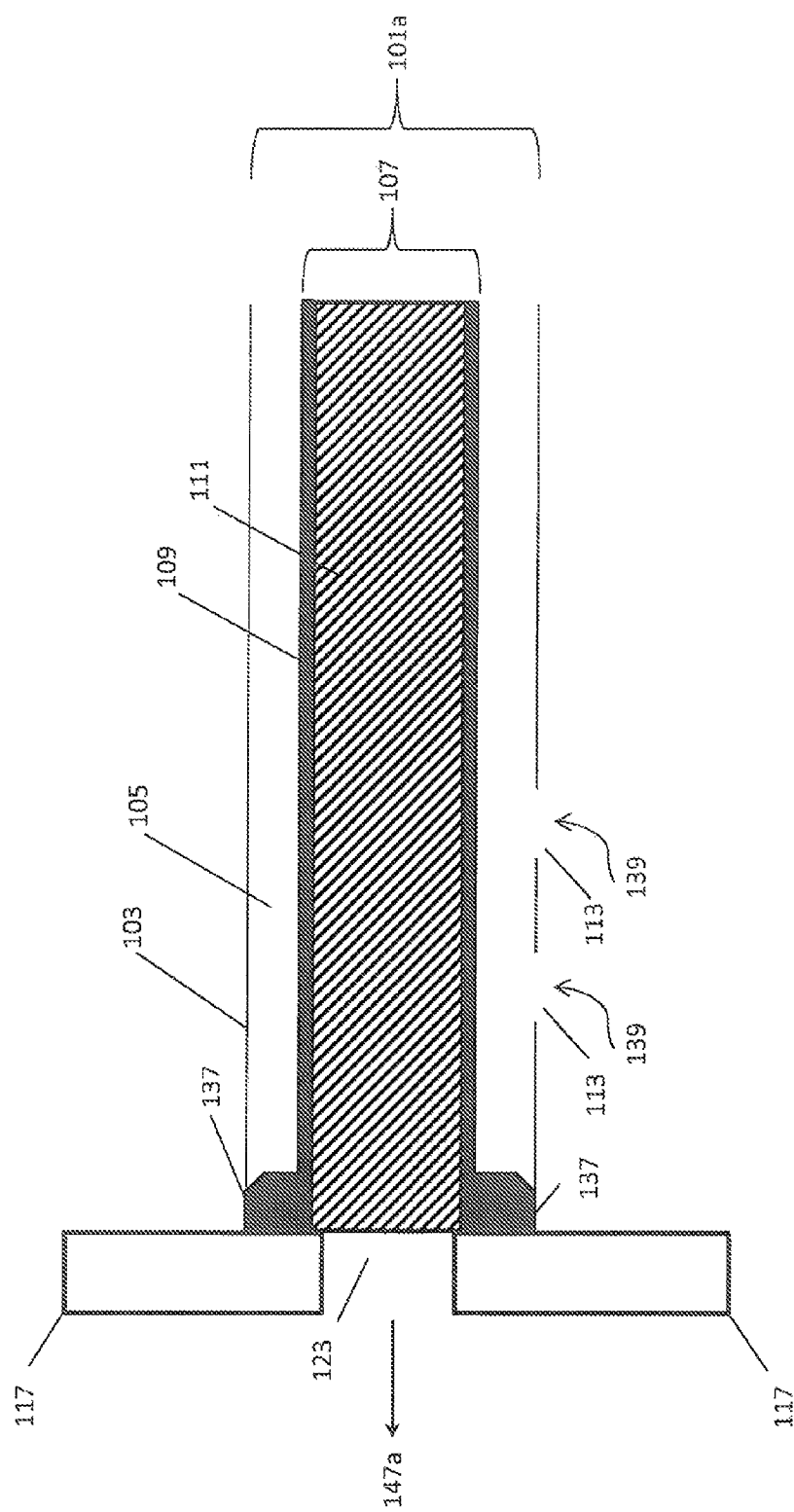
FIG. 2 is zoomed-in view of one end of the gas separation membrane module of FIG. 1.

A zoomed-in view of one end of the tube, 101*a*, is shown in FIG. 2.

From this figure, it can be seen that during operation, a feed gas, 139, enters the tube, 101*a*, through a feed gas opening, 113, and into the tube interior/feed flow channel, 105. The feed gas comes into contact with the outer surface, 109, of membrane, 107. In operation, a permeating component within the gas will flow into the inner lumen, 111, and exit the membrane, 107, as a permeate gas, 147*a*, via permeate gas openings, 123. Likewise, at the other end of the module, depending on the mode of operation, a permeate gas or sweep gas, 147*b*, can also exit or enter the membrane (not shown).

Referring back to FIG. 1, a gas distribution pipe, 125, runs the length of module 100 and through tube sheet plates, 117 and 119. The gas distribution pipe, 125, has a pipe interior, 127, that is divided into a feed section, 131, and a residue section, 135 by a gas-tight plate, 145. In the feed section, 131, the gas distribution pipe, 125, contains at least one feed gas aperture. 129, that is in gas-transferring communication with the feed gas openings, 113, of each tube, 101*a-h*. In the residue section, 135, the gas distribution pipe, 125, contains at least one residue aperture, 133, that is in gas transferring communication with the residue gas openings, 115, of each tube, 101*a-h*.

Figure 8:
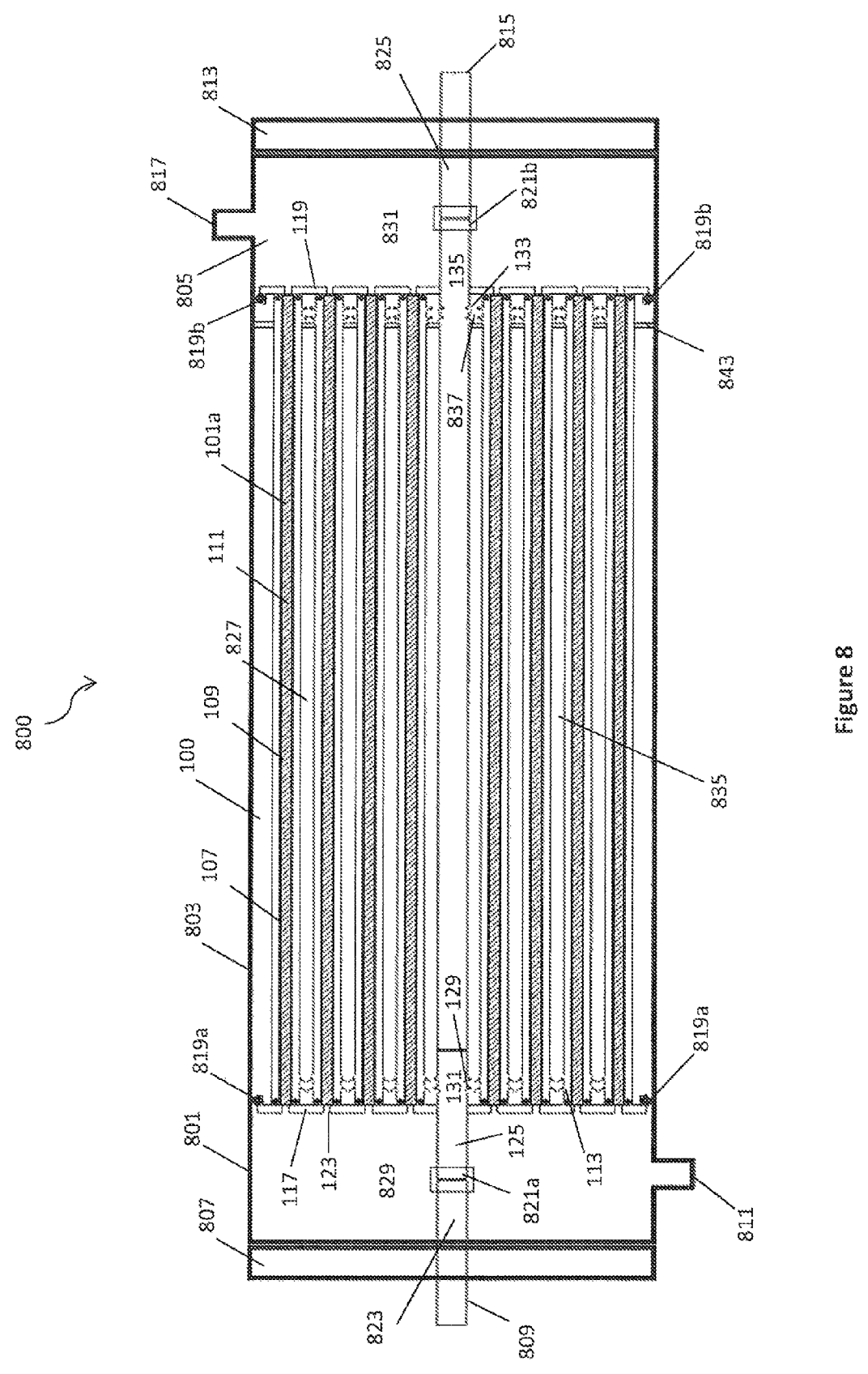

The operation of the module, 100, is discussed in further detail below in reference to FIGS. 8 and 9.

Figure 3:
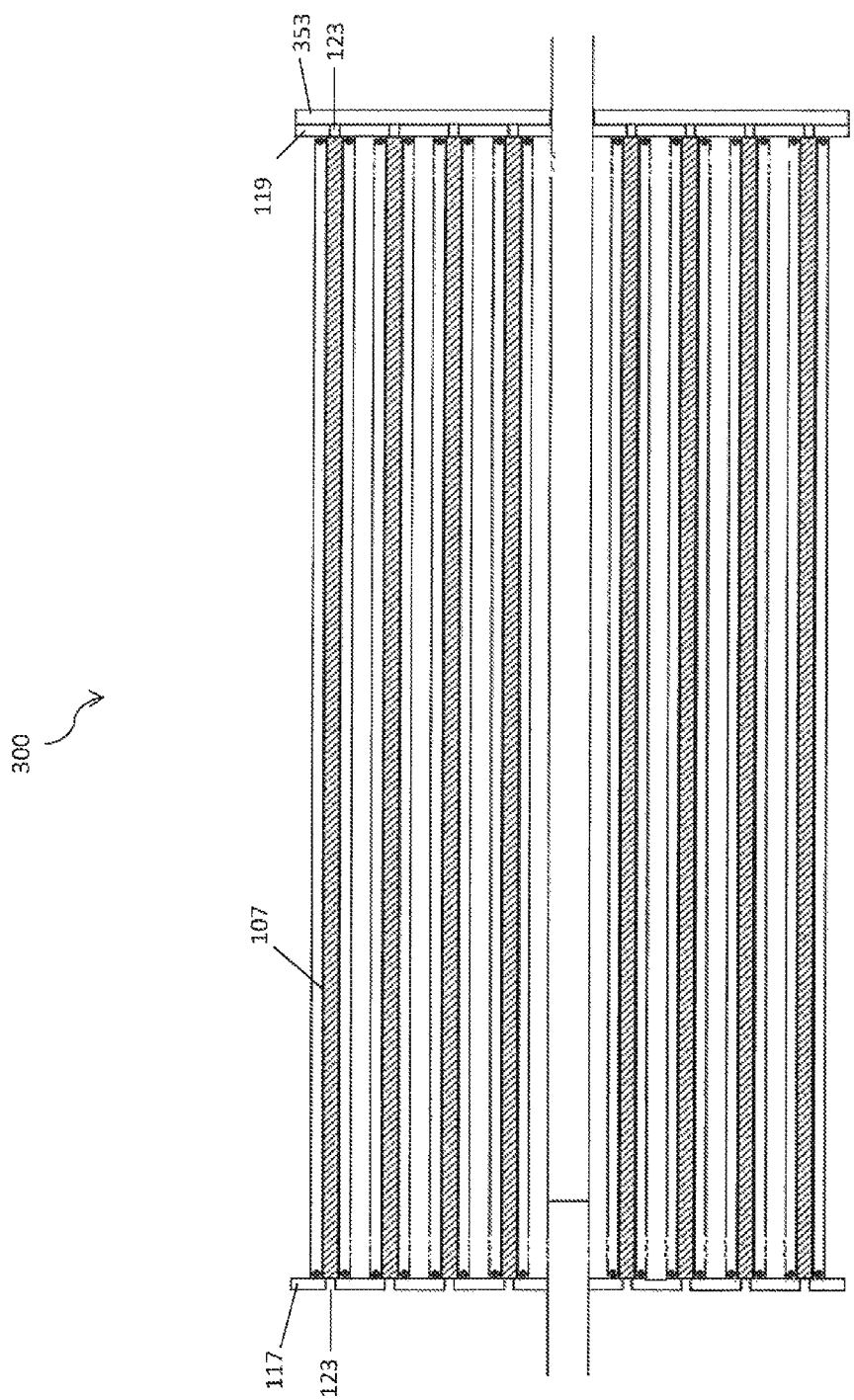
FIG. 3 is a schematic drawing showing an embodiment of the gas separation module of FIG. 1 where permeate gas can exit the module at only one end.

In some cases, it may be preferred that a permeate gas be withdrawn from only one end of a module. Such an embodiment is shown in FIG. 3.

Module 300, is identical to module, 100, discussed above in FIG. 1, except that it contains a cap or solid plate, 353, that is placed adjacent to the second tube sheet plate, 119, on the outer end of the module in order to block the permeate gas openings, 123, of second tube sheet plate, 119, so that permeate gas is only able to exit the module at the permeate gas openings, 123, of first tube sheet plate. 117. In other embodiments, the second tube sheet plate, 117, is a solid plate that does not contain a plurality of permeate gas openings; thus, solid plate 353 would not be needed.

Figure 4:
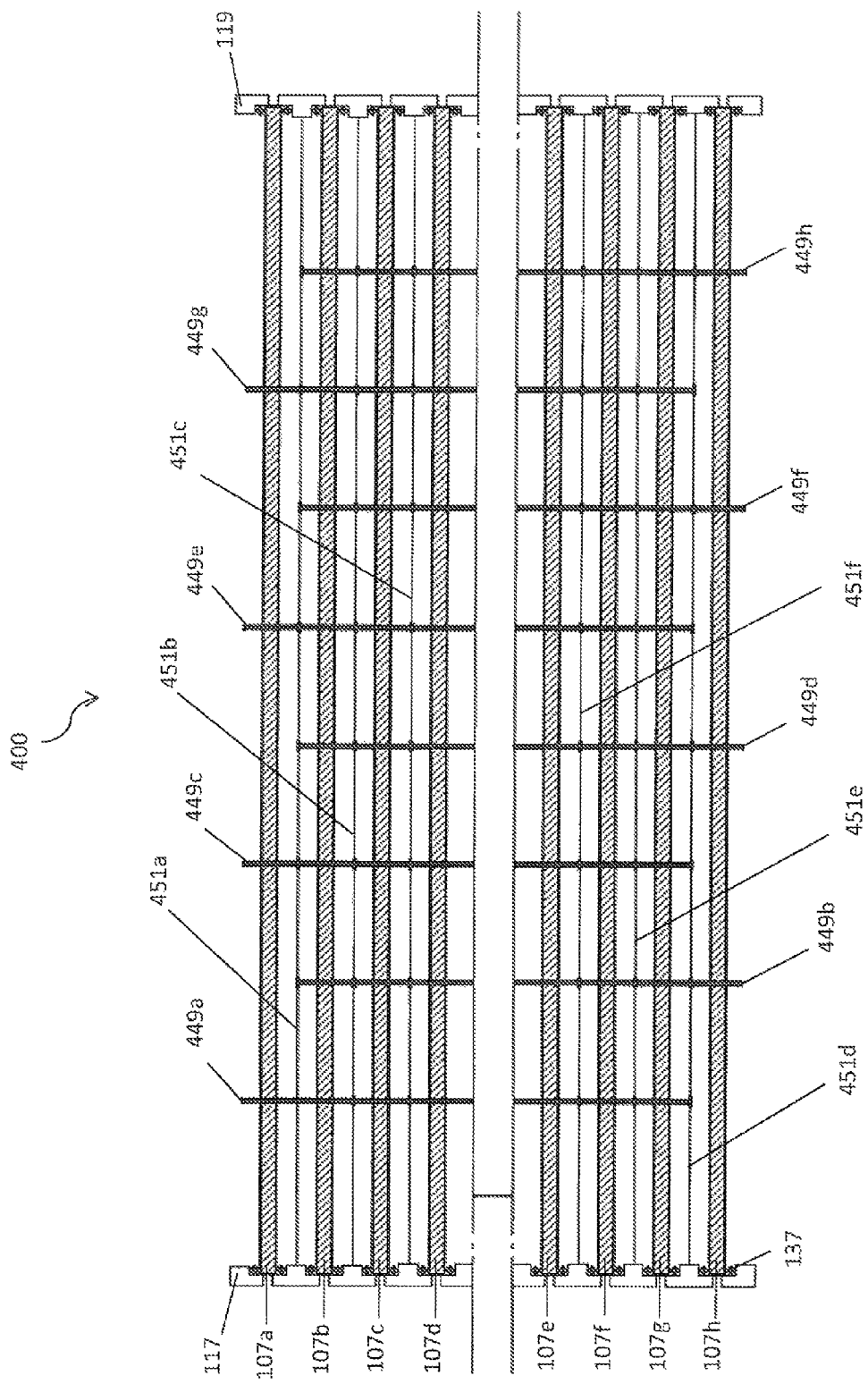
FIG. 4 is a schematic drawing showing an embodiment of the gas separation membrane module wherein the ceramic tubular membranes are not housed within tubes.

A view of an embodiment of the gas separation membrane module wherein the membranes are not housed within tubes is shown in FIG. 4. In this embodiment, the module, 400, retains all the components of module 100, from FIG. 1, except for the tubes.

Membranes, 107*a-h*, are supported against the tube sheet plates, 117 and 119. Gas-tight seals 137 surround the membranes, 107*a-h*, and butt up against the tube sheet plates, 117 and 119. Baffles, 449*a-h*, are positioned between tube sheet plates 117 and 119 to assist in directing the feed gas to the membranes, 107*a-h*. Tie rods 451*a-f* extend across module 400 from the first tube sheet plate 117 to the second tube sheet plate 119.

Figure 5:
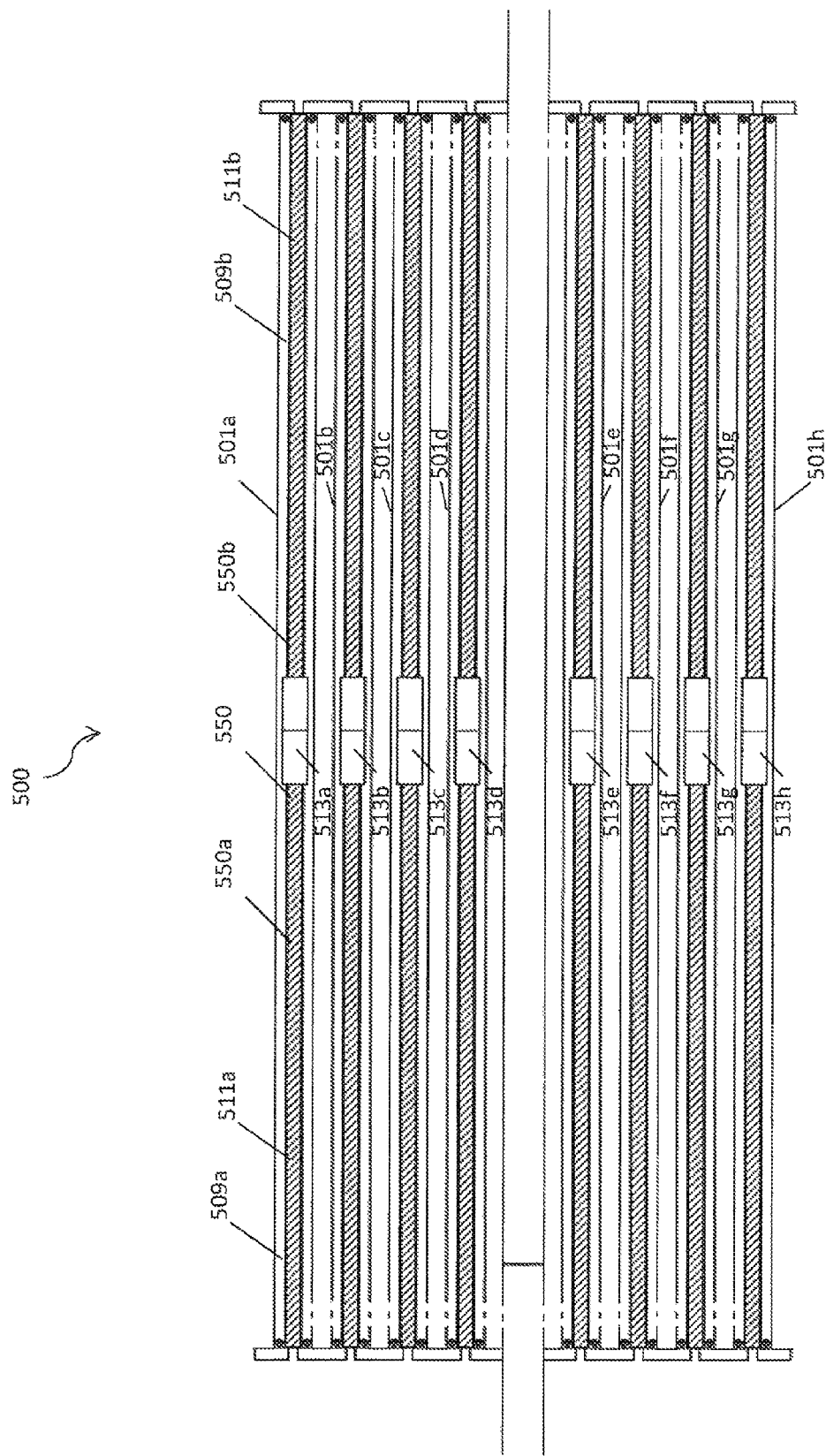
FIG. 5 is a schematic drawing showing an embodiment of the gas separation membrane module comprising two membrane sections within each tube connected together by a gas-tight connector.
Figure 6:
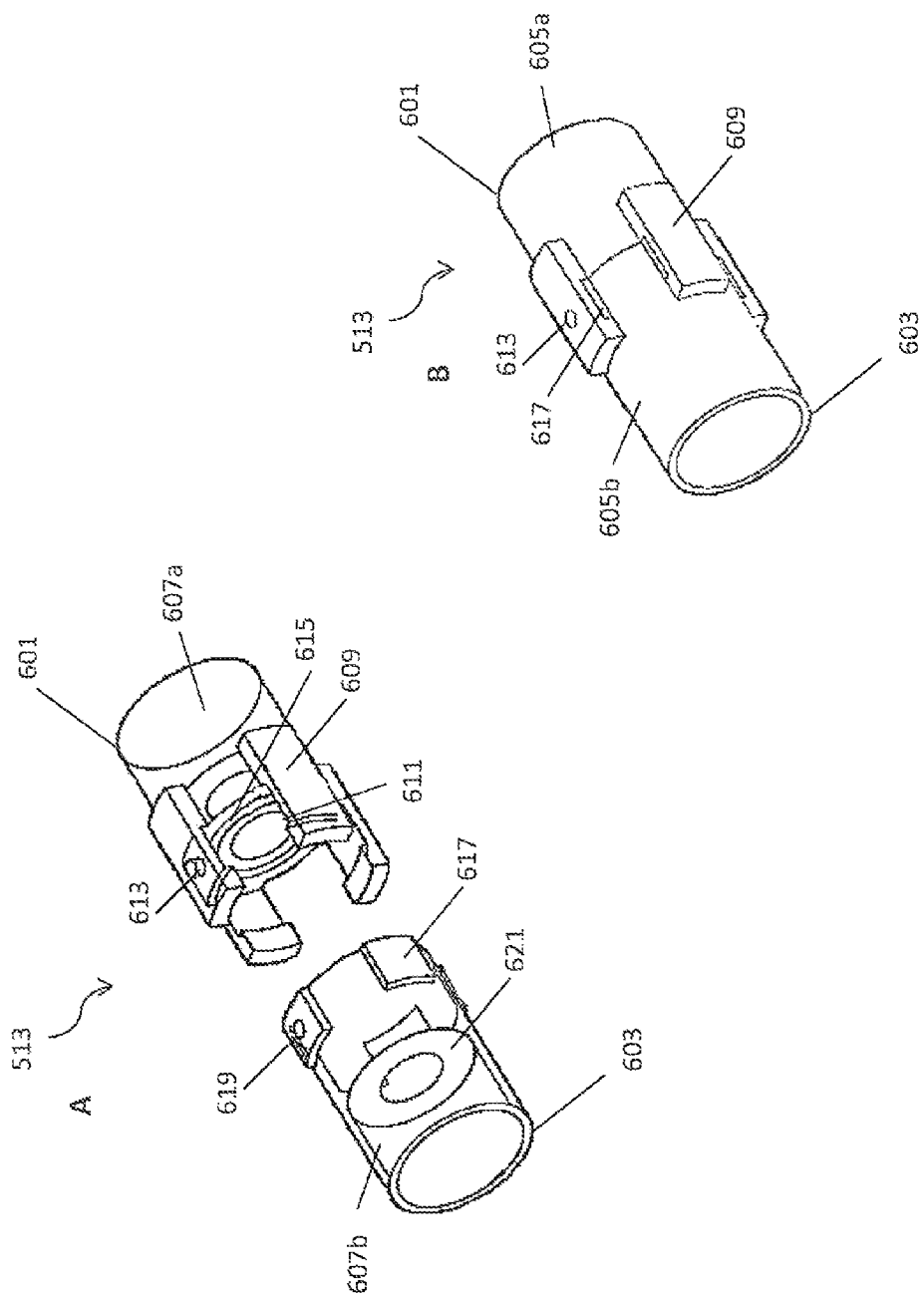
FIG. 6A-B is a schematic drawing showing (A) an internal view of a detached first portion and a detached second portion of the gas-tight connector of FIG. 5 and (B) an external view of attached first and second portions of the gas-tight connector of FIG. 5.

A view of an embodiment of the gas separation membrane module comprising two membrane sections within each tube connected together by a gas-tight connector is shown in FIG. 5.

Module 500 contains a plurality of tubes, 501*a-h*, each housing a ceramic tubular membrane, 550. The membrane is made up to two sections, 550*a* and 550*b*, each having an outer wall, 509*a-b*, and an inner lumen 511*a-b*. Membrane sections 550*a* and 550*b* are connected in a gas-transferring relationship by a gas-tight connector, 513. Connectors 513*a-h* allow permeate gas to flow from the inner lumen, 511*a*, to inner lumen 511*b*.

FIG. 6A-B shows a detailed schematic drawing of an embodiment of the gas-tight connector, 513. Gas-tight connector 513 comprises a first section, 601, and a second section, 603. Sections 601 and 603 are detachable from one another. FIG. 6A illustrates sections 601 and 603 when separated and FIG. 6B illustrates the sections when fitted together.

First section 601 comprises an outer wall, 605*a*, and an interior, 607*a*. At one end of the first section, 601, there are a series of individual ribs, 609, positioned around the end of first section 601 that are slightly raised above the outer wall, 605*a*. The ribs, 609, extend beyond the connector interior, 607*a*. Each of the ribs, 609, has a grove, 611. Additionally, one of the ribs contains a locking pin, 613. The first section interior, 607*a*, contains a grove for a gasket, 615.

Second section 603 also comprises an outer wall, 605*b*, and an interior, 607*b*. At one end of the second section, 603, there are series of raised portions, 617, that correspond to groves, 611 of the ribs, 609, from the first section, 601. One of the raised portions, 617, contains a hole, 619, for locking pin 613. The second section interior, 607*b*, contains a gasket, 621.

As shown in FIG. 6B, first and second sections 601 and 603 are fitted together by aligning and rotating the ribs, 609, to interlock and fit over raised portions, 617. Locking pin 613 is placed in hole 619 to secure the sections together. A gasket, 621, fits in the gasket grove, 615, which creates a gas-tight seal within the connector, 513, and prevents permeate gas from leaking out of the inner lumen.

Figure 7:
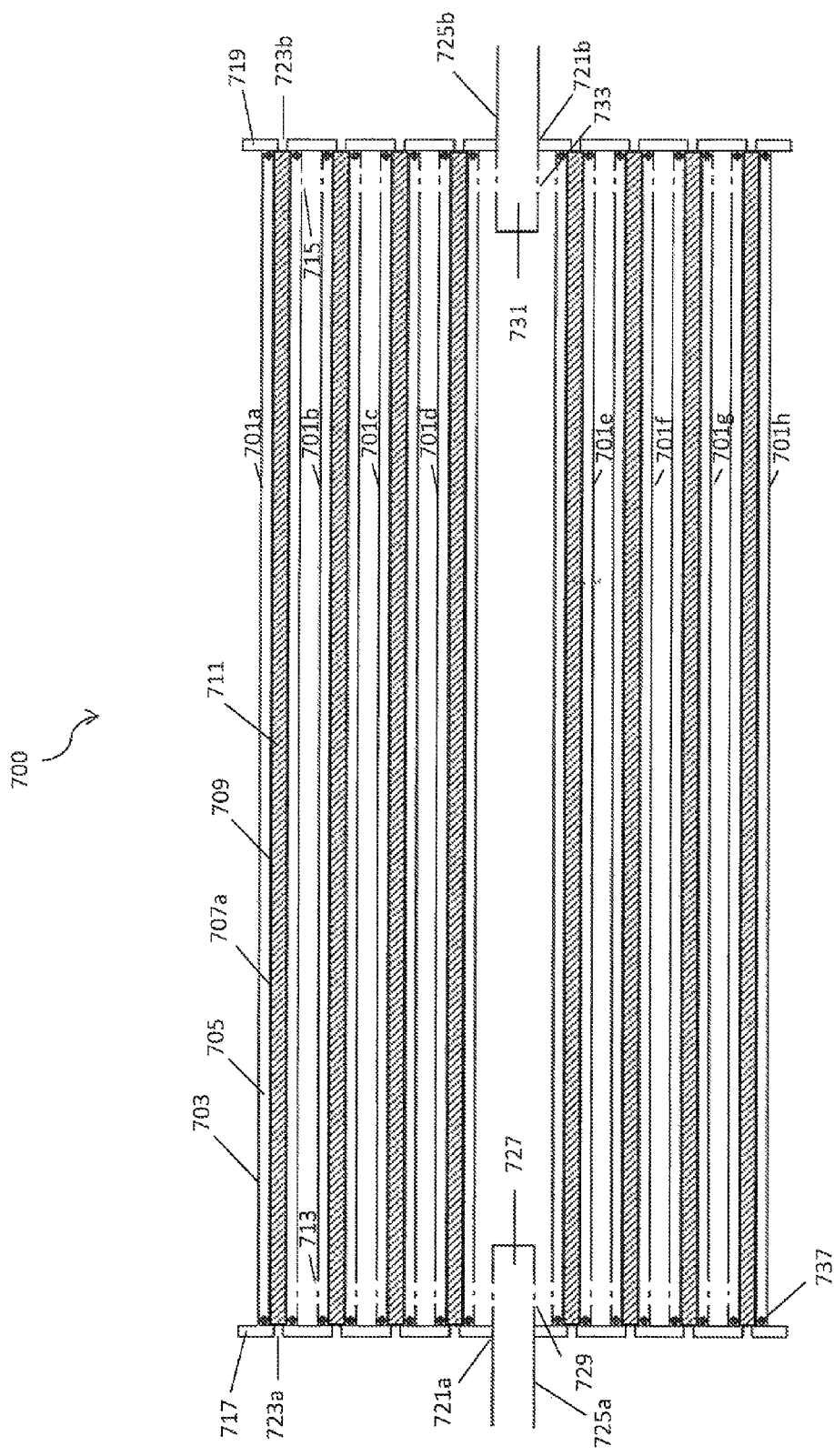
FIG. 7 is a schematic drawing showing an embodiment of the gas separation membrane module having two separate, short gas distribution pipes.

FIG. 7 illustrates an embodiment of the gas separation module in which the gas distribution pipe is split into two separate, short sections rather than a single gas distribution pipe running the length of the module.

Module 700, contains a plurality of tubes, 701*a-h*, each of which comprise a longitudinal tube wall, 703, and a tube interior. 705, which is enclosed by the tube wall. The tube wall comprises at least one feed gas opening, 713, at one end and a residue gas opening. 715, at the other end.

Each tube, 701*a-h*, houses a ceramic tubular membrane. 707*a-h* (only one shown), which comprises an outside surface, 709, and an inner lumen, 711. The membranes, 707*a-h*, are inserted into the tubes, 701*a-h*, through the open ends. The outside surface, 709, of the membranes comprises the membrane selective layer, meaning that the module is adapted to have a permeate flow from the outside surface, 709, to the inner lumen, 711.

The tubes, 701*a-h*, are held within the module, 700, by means of a first tube sheet plate, 717, and a second tube sheet plate, 719. Tube sheet plates, 717 and 719, comprise a gas distribution pipe opening, 721*a-b*, and a plurality of permeate gas openings, 723*a-b*, for each tube, 701*a-h*. The tubes are aligned over the permeate gas openings to provide gas-transferring communication between the permeate gas openings and the inner lumen.

Gas-tight seals, 737 (only one labeled for simplicity), are placed at the end of each ceramic tubular membrane, 707, for holding the membrane in gas-tight relationship against the tube sheet plates, 717 and 719.

A feed gas distribution pipe, 725*a*, runs through distribution pipe opening, 721*a*. The feed gas distribution pipe, 725*a*, has a feed pipe interior, 727, and contains at least one feed gas aperture, 729, that is in gas-transferring communication with the feed gas openings. 713, of each tube, 701*a-h*. At the other end of module 700, a residue gas distribution pipe, 725*b*, runs through distribution pipe opening, 721*b*. The residue gas distribution pipe. 725*b*, has a residue pipe interior, 731, and contains at least one residue gas aperture, 733, that is in gas transferring communication with the residue gas openings, 715, of each tube, 701*a-h*.

A view of a basic embodiment of a gas separation assembly housing the gas separation module, 100 (described above), is shown in FIG. 8. Descriptions of the features of module 100 are described above with reference to FIG. 1. Some of these features are not labeled in FIG. 8 for simplicity.

The assembly is generally indicated by 800, and includes a vessel, 801, containing a module, 100. The vessel or housing has an outer wall or shell, 803, and an interior space, 805, located between a first removable head, 807, and a second removable head, 813.

Outer wall or shell, 803, further comprises a first permeate nozzle, 811, at the end of the vessel, 801, near the first removable head, 807, and a second permeate nozzle, 817, at the other end of the vessel near the second removable head, 813.

First removable head, 807, comprises a feed nozzle, 809. A feed gas extension pipe, 823, runs through the first removable head, 807, and is connected to the gas distribution pipe, 125, by connector, 821*a*, to be in gas-transferring communication with feed section 131. The second removable head, 813, comprises a residue nozzle, 815. A residue gas extension pipe, 825, runs through the second removable head, 813, and is connected to the gas distribution pipe, 125, by connector, 821*b*, to be in gas-transferring communication with residue section, 135.

The vessel interior, 805, contains module 100. Expandable gas-tight seals, 819*a-b*, are placed around each of the first and second tube sheet plates, 117 and 119, for holding module 100 in a gas-tight relationship against the shell, 803.

The seals create a module interior, 827, between the first and second tube sheet plates, 117 and 119, as well as a first permeate chamber, 829, between the first removable head, 807, and the first tube sheet plate, 117, and a second permeate chamber, 831, between the second removable plate, 813, and the second tube sheet plate, 119. First and second permeate chambers, 829 and 831, are in gas-transferring communication with the permeate gas openings of tube sheet plates, 117 and 119, respectively, and with the first and second permeate nozzles, 811 and 817.

Assembly 800 further comprises a dividing plate, 843, located within the module interior, 827, to divide the module interior into a feed chamber, 835, and a residue chamber, 837.

When the assembly is in use, a raw, untreated feed gas first enters the vessel, 801, through feed gas extension pipe, 823. The feed gas then flows into the gas distribution pipe, 125, and into module 100. Within module 100, the feed gas passes through the feed aperture, 129, of gas distribution pipe 125, and into the feed chamber, 835. The feed gas fills the feed chamber, 835, and enters the plurality of tubes, 101*a-h*, through the feed gas openings, 113.

Within each tube, 101*a-h*, the feed gas, which is typically as high pressure, flows across the surface of the ceramic tubular membrane, 107. The permeate side of membrane 107 is normally maintained at lower pressure to provide a driving force for transmembrane permeation. Permeating gas from membrane 107 passes across the outside surface, 109, and into the inner lumen, 111. The permeate gas is directed out of the inner lumen, 111, through the permeate gas openings, 123, of tube sheet plates 117 and 119, and is collected in first and second permeate chambers 829 and 831. The permeate gas exits vessel 801, through first and second permeate nozzles 811 and 817.

Similarly, the residue gas is collected in residue chamber. 837, and flows into the gas distribution pipe, 125, through residue aperture 133. The residue gas is withdrawn from module 100 by gas distribution pipe 125 and exits vessel 801 through the residue nozzle, 815.

Figure 9:
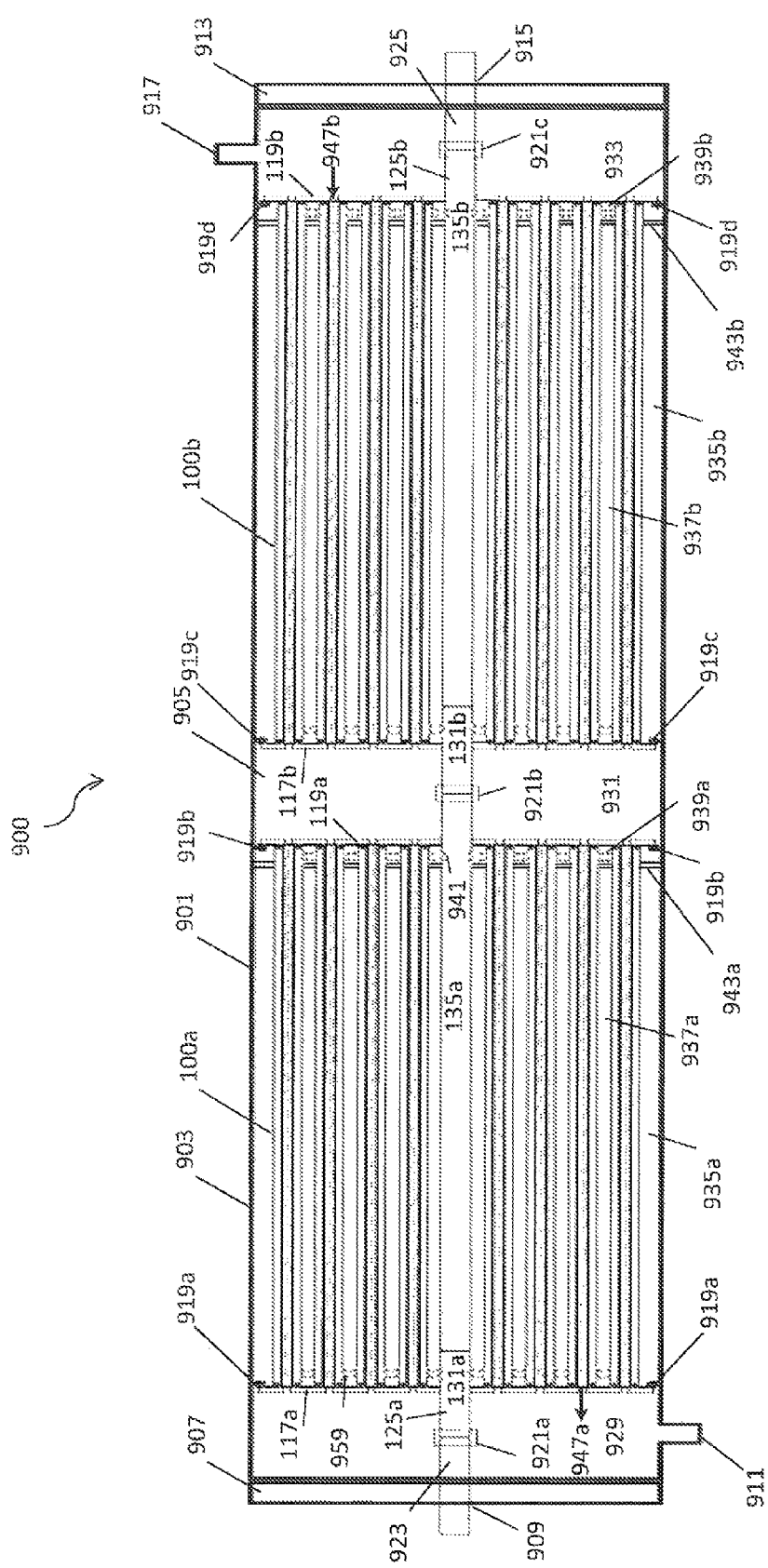
FIG. 9 is a schematic drawing showing an embodiment of an assembly adapted to house more than one module of FIG. 1.

A view of a basic embodiment of a gas separation assembly housing two gas separation membrane modules. 100*a* and 100*b*, is shown in FIG. 9. Descriptions of the features of modules 100*a* and 100*b* are described above with reference to FIG. 1. Some of these features of the modules are not labeled in FIG. 9 for simplicity.

The assembly, 900, includes a vessel, 901, containing modules, 100*a* and 100*b*. The vessel or housing has an outer wall or shell, 903, and an interior space. 905, located between a first removable head, 907, and a second removable head, 913.

Outer wall or shell. 903, further comprises a first permeate nozzle, 911, at the end of the vessel, 901, near the first removable end plate, 907, and a second permeate/sweep gas nozzle, 917, at the other end of the vessel near the second removable end plate, 913.

First removable end plate, 907, comprises a feed nozzle, 909. A feed gas extension pipe, 923, runs through feed first removable end plate 907 and is connected to a gas distribution pipe, 125*a*, by connector, 921*a*, to be in gas-transferring communication with feed section 131*a* of the first module. 100*a*. The second removable end plate, 913, comprises a residue gas extension pipe opening, 915. A residue gas extension pipe, 925, runs through second removable end plate 913 and is connected to the gas distribution pipe, 125*b*, by connector, 921*c*, to be in gas-transferring communication with residue section, 135*b*, of the second module, 100*b*.

The vessel interior, 905, contains modules 100*a* and 100*b*. Expandable gas-tight seals, 919*a-d*, are placed around each of the first and second tube sheet plates, 117*a-b* and 119*a-b*, of each module for holding the modules in a gas-tight relationship against the shell. 903. The seals create a module interior, 935*a-b*, between the first and second tube sheet plates, 117*a-b* and 119*a-b* of each module. The seals also create a first permeate chamber, 929, between the first removable head, 907, and the first tube sheet plate, 117*a*, a second permeate chamber, 931, between second tube sheet plate 119*a* of module 100*a* and first tube sheet plate 117*b* of module 101*b*, and a third permeate chamber, 933, between second tube sheet plate 119*b* of module 100*b* and second removable head 913. First and third permeate chambers, 929 and 933, are in gas-transferring communication with the permeate gas openings (not labeled) of tube sheet plates, 117*a* and 119*b*, respectively, and with the first and second permeate/sweep gas nozzles. 911 and 917. The second permeate chamber, 931, is in gas-transferring communication with the first and third permeate chambers, 929 and 933.

The residue section, 135*a*, of the gas distribution pipe from the first module 100*a* is connected to the feed section. 131*b*, of the gas distribution pipe from module 100*b* by connector 921*b*. This provides gas-transferring communication of the treated residue gas from the first module to be passed as a feed gas to the second module.

Assembly 900 further comprises dividing plates, 943*a-b*, located within the module interiors, 935*a-b*, to divide the module interiors into feed chambers, 937*a-b*, and residue chambers. 939*a-b*.

When the assembly is in use, a raw, untreated feed gas first enters the vessel, 901, through feed gas extension pipe, 923. The feed gas then flows into the gas distribution pipe, 125*a*, and into module 100*a*. Within module 100*a*, the feed gas passes through the feed aperture (not labeled) of gas distribution pipe 125*a*, and into the feed chamber, 935*a*. The feed gas fills the feed chamber, 935*a*, and enters the plurality of tubes, 101*a-h* (not labeled), through the feed gas openings (not labeled). The feed gas entering the plurality of tubes is shown by the arrows (for example, 959).

Within each tube, 101*a-h*, the feed gas, which is typically as high pressure, flows across the surface of the ceramic tubular membrane (not labeled). The permeate side of the membrane is normally maintained at lower pressure to provide a driving force for transmembrane permeation. Permeating gas from the membrane passes across the outside surface (not labeled) and into the inner lumen (not labeled). The permeate gas, 947*a*, is directed out of the inner lumen through the permeate gas openings (not labeled) of tube sheet plate 117*a* and is collected in first permeate chamber 929. The permeate gas exits vessel 901, through first permeate nozzle 911.

To provide an additional driving force for transmembrane permeation, a sweep gas (947*b*), enters the assembly, 900, through second permeate/sweep gas nozzle. 917, and flows into the third permeate chamber, 933. The sweep gas, 947*b*, then enters module 100*b* through permeate gas openings (not labeled) of tube sheet plate 119*b*. A permeate gas is collected in second permeate chamber 931 and is passed as a sweep gas to module 100*a*.

The residue gas exiting the plurality of tubes is shown by the arrows (for example, 941). The residue gas flows from the tubes and is collected in the residue chamber, 939*a*, where it is then directed into the into the residue section. 135*a*, of gas distribution pipe 125*a* through residue apertures (not labeled). The residue gas then exits module 100*a* and passes into module 100*b* through the feed section, 131*b*, of the gas distribution pipe, 125*b*. The residue gas eventually exits the assembly 900 through residue nozzle 915 via residue gas extension pipe 925.

Figure 10:
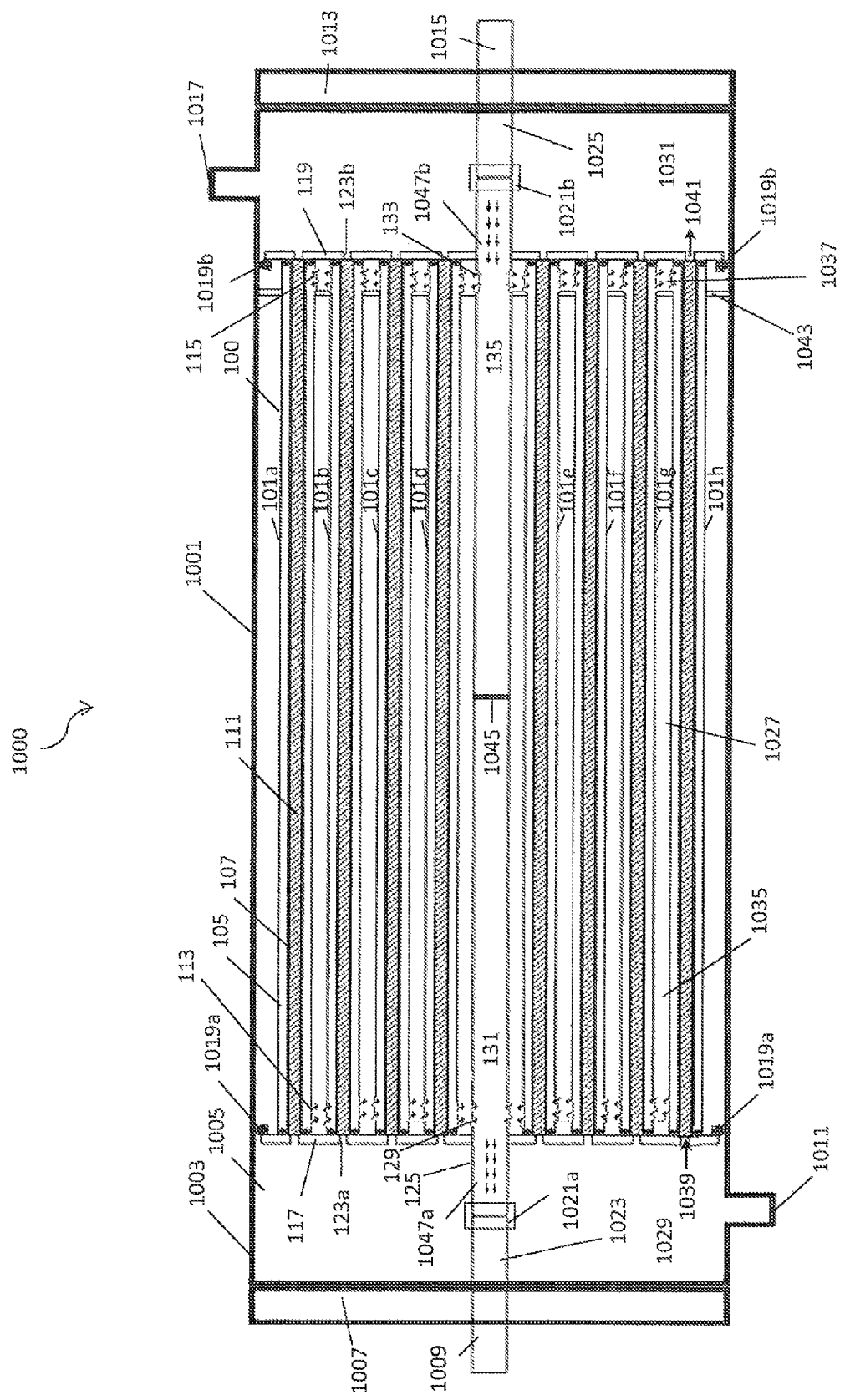
FIG. 10 is a schematic drawing showing an embodiment of an assembly housing a module adapted to have a permeate flow from the inner lumen to the outside surface.

A view of a basic embodiment of the gas separation membrane module adapted to have a permeate flow from the inner lumen to the outside surface is shown in FIG. 10. The embodiment in FIG. 10 is arranged in a counter-current flow scheme, however, the assembly, as in the other embodiments, may be reconfigured to allow for other schemes, such as cross-flow or co-flow, to be used.

The assembly, 1000, includes a vessel, 1001, containing a module, 100. The vessel or housing has an outer wall or shell, 1003, and an interior space, 1005, located between a first removable head, 1007, and a second removable head, 1013.

Outer wall or shell, 1003, further comprises a feed nozzle, 1011, at the end of the vessel, 1001, near the first removable head. 1007, and a residue nozzle, 1017, at the other end of the vessel near the second removable head, 1013.

First removable head, 1007, comprises a first permeate nozzle, 1009. A first permeate gas extension pipe, 1023, runs through the first removable head, 1007, and is connected to the gas distribution pipe, 125, by connector, 1021*a*, to be in gas-transferring communication with first permeate section 131. The second removable head, 1013, comprises a second permeate/sweep nozzle, 1015. A second permeate/sweep gas extension pipe, 1025, runs through the second removable head, 1013, and is connected to the gas distribution pipe, 125, by connector, 1021*b*, to be in gas-transferring communication with second permeate/sweep section, 135.

The vessel interior. 1005, contains module 100. Expandable gas-tight seals, 1019*a-b*, are placed around each of the first and second tube sheet plates, 117 and 119, for holding module 100 in a gas-tight relationship against the shell, 1003.

The seals create a module interior, 1027, between the first and second tube sheet plates, 117 and 119, as well as a feed chamber, 1029, between the first removable head, 1007, and the first tube sheet plate, 117, and a residue chamber, 1031, between the second removable plate, 1013, and the second tube sheet plate, 119. Feed and residue chambers, 1029 and 1031, are in gas-transferring communication with the feed and residue gas openings, 123*a-b*, of tube sheet plates, 117 and 119, respectively, and with the feed and residue nozzles, 1011 and 1017.

Assembly 1000 further comprises a dividing plate, 1043, located within the module interior, 1027, to divide the module interior into a first permeate chamber, 1035, and a second permeate/sweep chamber, 1037.

When the assembly is in use, a raw, untreated feed gas first enters the vessel, 1001, through feed nozzle 1011, and is collected in feed chamber 1029. The feed gas, 1039, enters the tubes, 101*a-h*, through a feed gas opening 123*a* in the first tube sheet plate, 117, and into the inner lumen, 111, of the membrane, 107, in the tube, 101*a*. The feed gas comes into contact with the selective layer on the inner surface of the inner lumen, 111. A permeating component within the gas will exit the membrane and flow into the tube interior flow channel, 105, as a permeate gas, 1047*a*. The permeate gas, 1047*a*, exits the tubes, 101*a-h*, through permeate gas openings on the tubes, 113. The permeate gas then flows into the permeate section, 131, of gas distribution pipe 125, via permeate aperture, 129. The permeate gas exits the assembly though nozzle 1009.

A residue gas, 1041, flows through the inner lumen and exits the tubes, 101a-h (and module 100), through residue gas openings 123b on the second tube sheet plate, 1019. The residue gas is collected in residue gas chamber 1031 and exits the assembly through residue nozzle 1017.

A sweep gas, 1047b, enters the assembly through nozzle 1015 and flows into the module 100 through the sweep gas section, 135, of gas distribution pipe 125. The sweep gas then flows out of the gas distribution pipe, 125, through apertures, 133, and into tubes 101a-h via the sweep gas openings. 115. A gas-tight plate, 1045, within the gas distribution pipe 125, prevents the sweep gas, 1047b, from mixing with the permeate gas, 1047a.

Applicants have described and illustrated various specific embodiments of the subject invention, from which those of skill in the art will be able to devise other variants without departing from the scope of the invention.

We claim:

1. A gas separation module, comprising:
   (a) a plurality of tubes each having a longitudinal tube wall and a tube interior containing a ceramic tubular membrane that has an outside surface and an inner lumen, each tube wall containing at least one feed gas opening at one end and at least one residue gas opening at the other end;
   (b) a first tube sheet plate and a second tube sheet plate each positioned at opposite ends of the module, each tube sheet plate containing a gas distribution pipe opening and at least one of the tube sheet plates having a plurality of permeate gas openings, one permeate gas opening for each tube, the tubes being aligned with the permeate gas openings to provide gas-transferring communication between the permeate gas openings and the inner lumens;
   (c) a gas distribution pipe that runs the length of the module through the gas distribution pipe openings, having a pipe interior that is divided into a feed section and a residue section, and having at least one feed aperture in the feed section to provide gas-transferring communication with the feed gas openings, and at least one residue aperture in the residue section to provide gas-transferring communication with the residue gas openings; and
   (d) a gas-tight seal at each end of each ceramic tubular membrane for holding the membrane in gas-tight relationship against the first and second tube sheet plates.

2. The gas separation module of claim 1, wherein at least one of the permeate gas opening has a diameter that is smaller than the outer diameter of the ceramic tubular membrane.

3. The gas separation module of claim 1, wherein both tube sheet plates have a plurality of permeate gas openings.

4. The gas separation module of claim 1, wherein only one of the first or second tube sheet plates contains a plurality of permeate gas openings.

5. The gas separation module of claim 1, wherein the pipe interior is divided into the feed section and the residue section by at least one gas-tight plate positioned between the at least one feed aperture and the at least one residue aperture.

6. The gas separation module of claim 1, wherein each tubular ceramic membrane comprises two or more membrane sections coupled together by a gas-tight connector.

7. A gas separation assembly, comprising:
   (a) a vessel having a first head comprising a feed nozzle, a second head comprising a residue nozzle, and a shell between the heads, the heads and the shell defining a vessel interior;
   (b) a module as in claim 1 mounted in the vessel interior, and aligned with the feed section of the gas distribution pipe protruding towards or through the feed nozzle and the residue section of the gas distribution pipe protruding towards or through the residue nozzle;
   (c) a gas-tight seal around each of the first and second tube sheet plates for holding the module in a gas-tight relationship against the shell, thereby creating a module interior between the first and second tube sheet plates, and a first permeate chamber between the first head and the first tube sheet plate;
   (d) a dividing plate located within the module interior between the at least one feed aperture and the at least one residue aperture to divide the module interior into a feed chamber and a residue chamber, the dividing plate being in a gas-tight relationship against the shell and having a second gas distribution pipe opening and a plurality of tube openings, one tube opening for each tube; and
   (e) a first permeate nozzle located on the vessel in gas-transferring communication with the first permeate chamber.

8. The assembly of claim 7, wherein at least one of the first or second heads is removable.

9. The assembly of claim 7, wherein the first permeate nozzle is located on the shell of the vessel.

10. The assembly of claim 7, further comprising a second permeate chamber located between the second head and the second tube sheet plate.

11. The assembly of claim 10, further comprising a second permeate nozzle located on the vessel in gas-transferring communication with the second permeate chamber.

12. The assembly of claim 11, wherein the second permeate nozzle is located on the shell of the vessel.

13. The assembly of claim 7, further comprising a feed extension pipe running through the feed nozzle of the first head and a residue extension pipe running through the residue nozzle of the second head, each extension pipe being in gas-transferring communication with the gas distribution pipe.

14. A gas separation assembly, comprising:
   (a) a vessel having a first head comprising a feed nozzle, a second head comprising a residue nozzle, and a shell between the heads, the heads and the shell defining a vessel interior;
   (b) at least two modules of claim 1 mounted in the vessel interior, both modules being aligned with the feed section of the gas distribution pipe protruding towards or through the feed nozzle and the residue section of the gas distribution pipe protruding towards or through the residue nozzle;
   (c) a gas-tight seal around each of the first and second tube sheet plates of each module for holding the modules in a gas-tight relationship against the shell, thereby creating a module interior between the first and second tube sheet plates, and a first permeate chamber between the first head and the first tube sheet plate of the first module;
   (d) a dividing plate located within each module interior between the at least one feed aperture and the at least one residue aperture to divide the module interior into a feed chamber and a residue chamber, the dividing plate being in a gas-tight relationship against the shell and having a second gas distribution pipe opening and a plurality of tube openings, one tube opening for each tube; and (e) a first permeate nozzle located on the vessel in gas-transferring communication with the first permeate chamber.

15. The assembly of claim 14, wherein the first permeate nozzle is located on the shell of the vessel.

16. The assembly of claim 14, further comprising a second permeate chamber located between the second tube sheet plate of the first module and the first tube sheet plate of the second module.

17. The assembly of claim 16, further comprising a third permeate chamber located between the second tube sheet of the second module and the second head.

18. The assembly of claim 17, further comprising a second permeate nozzle located on the vessel in gas-transferring communication with the third permeate chamber.

19. The assembly of claim 18, wherein the second permeate nozzle is located on the shell of the vessel.

20. The assembly of claim 14, further comprising a feed extension pipe running through the feed nozzle of the first head and a residue extension pipe running through the residue nozzle of the second head, each extension pipe being in gas-transferring communication with the gas distribution pipe.

21. The assembly of claim 14, wherein at least one of the first or second heads is removable.

\* \* \* \* \*